United States Patent [19]

Kaun

[11] Patent Number: 5,194,298

[45] Date of Patent: Mar. 16, 1993

[54] METHOD OF PREPARING CORROSION RESISTANT COMPOSITE MATERIALS

[76] Inventor: Thomas D. Kaun, 320 Willow St., New Lenox, Ill. 60451

[21] Appl. No.: 582,525

[22] Filed: Sep. 14, 1990

[51] Int. Cl.⁵ .................. B05D 5/10; B05D 3/02; B05D 5/00; C04B 35/60
[52] U.S. Cl. .................. 427/207.1; 427/226; 427/287; 427/398.1; 264/332; 156/89
[58] Field of Search .......... 264/60, 62, 332, DIG. 36; 156/89; 427/287, 376.1, 376.6, 423, 422, 398.1, 207.1, 226; 501/140; 428/615, 639; 423/511

[56] References Cited

U.S. PATENT DOCUMENTS

| | | | |
|---|---|---|---|
| 4,232,094 | 11/1980 | Rhodes et al. | 427/376.1 |
| 5,045,365 | 9/1991 | Okano et al. | 427/423 |
| 5,061,526 | 10/1991 | Robyn et al. | 427/423 |

Primary Examiner—James Lowe
Assistant Examiner—Christopher A. Fiorilla
Attorney, Agent, or Firm—Reinhart, Boerner, Van Deuren, Norris & Rieselbach

[57] ABSTRACT

Method of manufacture of ceramic materials which require stability in severely-corrosive environment having high alkali-metal activity, high sulfur/sulfide activity and/or molten halides at temperatures of 200°–550° C. or organic salt (including $SO_2$ and $SO_2Cl_2$) at temperatures of 25°–200° C. These surfide ceramics form stoichiometric (single-phase) compounds with sulfides of Ca, Li, Na, K, Al, Mg, Si, Y, La, Ce, Ga, Ba, Zr and Sr and show melting-points that are sufficiently low and have excellent wettability with many metals (Fe, Ni, Mo) to easily form metal/ceramic seals. Ceramic compositions are also formulated to adequately match thermal expansion coefficient of adjacent metal components.

12 Claims, 1 Drawing Sheet

METHOD OF PREPARING CORROSION RESISTANT COMPOSITE MATERIALS

The subject invention is concerned with the preparation of articles of manufacture and chemical products having long term stability when subjected to severely corrosive and reactive nonaqueous environments, such as operation at high temperature while in contact with molten halides, sulfides and/or alkali metals. More particularly, the invention is concerned with the preparation of corrosion resistant sulfide ceramic materials, such as CaS, $Y_2S_3$, $Al_2S_3$, $K_2S$, $Na_2S_2$, MgS based ceramics, and also combination sulfide/selenide ceramics.

It is frequently important to provide a material which is highly resistant to nonaqueous corrosive environments, such as, for containment of chemically reactive compositions of matter at high temperatures. One example of such a nonaqueous corrosive condition which demands resistant material includes the use of the molten forms of alkali metals, halides and sulfides as components in electrochemical battery cells. The typical approach is to utilize such conventional ceramics as MgO, BeO, $Y_2O_3$, $Al_2O_3$, BN and AlN. These materials, however, have substantial drawbacks, such as, very poor mechanical properties, including poor fabricability and limited chemical stability, when exposed to nonaqueous corrosive environments at high temperature. Furthermore, the melting point of the conventionally used ceramic is in excess of 2000° C., which is a difficult temperature processing range. Further, the thermal expansion coefficient of such conventional ceramics is often completely incompatible with adjacent metal components which are present. If bonding to metals is necessary, the metal component (the brazing agent) must wet the ceramics or an intermediate glass phase must be used. However, such conventional glasses are not chemically stable nor operable at higher temperatures normally encountered in highly corrosive environments of interest. If such unstable brazes, glasses, or ceramics are used, the resulting reaction products can cause formation of undesired electrical conductor materials, rather than remaining as the desired insulator material.

Conventional well known references, such as, K. Suganuma, Y. Miyamoto and M. Koizumi, "Joining of Ceramics and Metals", R. Huggins et al. Ed., Ann. Rev. Material Science 1988, 18:47-73, Annual Reviews Inc., have long recognized the need for a solution to the problem of successful construction of commercially useful structures for nonaqueous corrosive and/or high temperature environments.

It is therefore an object of the invention to provide a new method and article of manufacture of ceramic compositions which are stable in nonaqueous corrosive environments.

It is another object of the invention to provide a novel method and article of manufacture of solid state sulfides and/or selenides stable in nonaqueous corrosive and reactive environments.

It is an additional object of the invention to provide a new method and article of manufacture of ceramic to metal seals stable in nonaqueous corrosive environments.

It is a further object of the invention to provide a novel method and article of manufacture of a ceramic having a selectable thermal expansion coefficient substantially matchable with a selected adjacent metal or cermet.

It is yet another object of the invention to provide a new method and article of manufacture of a ceramic sulfide and/or selenide coating for protecting an underlying material from a nonaqueous corrosive environment.

It is still an additional object of the invention to provide a novel method and article of manufacture of ceramic to metal bonds at temperatures less than about 1200° C.

It is still a further object of the invention to provide an improved method and article of manufacture of a ceramic sulfide and/or selenide material exhibiting enhanced surface bonding and wetting character of the ceramic to a metal surface.

It is yet an additional object of the invention to provide a novel method and article of manufacture of ceramic sulfide and/or selenide materials having selectable electrical or ionic conductivity.

Further objects and advantages together with the method of manufacture of the compositions and articles of manufacture are set forth with particularity in the Drawing, Detailed Description and Examples described hereinafter.

DRAWING

FIG. 1 illustrates the variation in resistance of a doped chalogenide material coupled to a steel sheet.

DETAILED DESCRIPTION OF PREFERRED EMBODIMENTS

Figure 1:
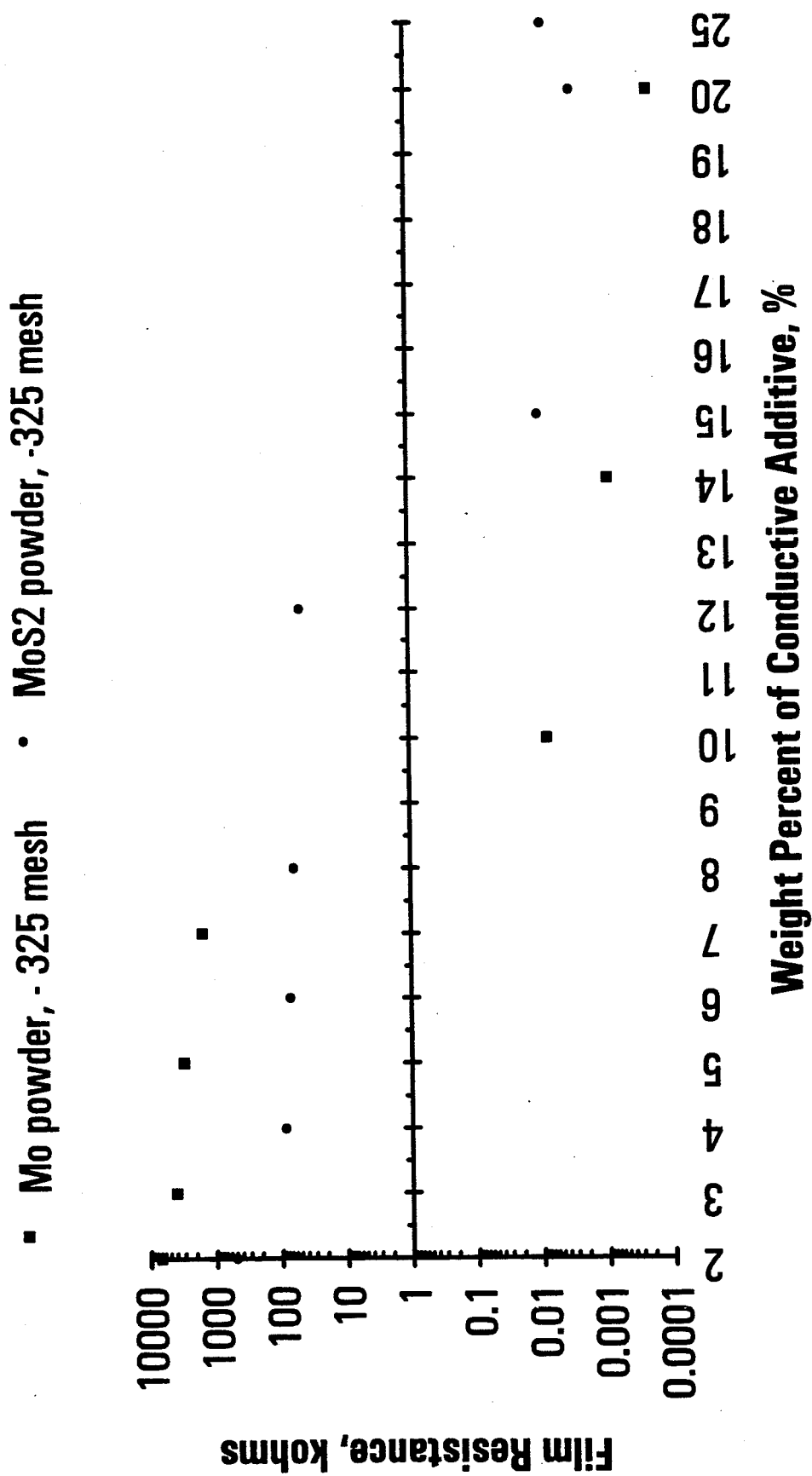

In one form of the invention a mixed-sulfide and/or selenide ceramic is formed of powders or a ceramic preform, and the ceramic is then disposed adjacent a metal surface. The starting ceramic material is heated to its melting temperature within an inert atmosphere. A ceramic to metal bond is formed readily without need for extensive surface preparation to insure wetability and adhesion. Compositions are varied to produce a desired melting temperature and insure thermal and chemical compatibility to specific metal components. As shown in Table I, the single-phase sulfide-based compositions have melting points of ≦1200° C., including sulfides such as $Y_2S_3$ and CaS which do not melt but decompose or sublime above 2000° C. These melting points are below that of the transition metals Fe and Ni, as well as below that of the refractory metals Mo and W. These low melting temperatures provide the advantage of enabling metal/ceramic bond formation within a conventional NiCr-element furnace.

As described herein, sulfide ceramics are comprised of predominantly nontransition metal sulfides which are electronic insulator materials unless otherwise indicated or have been modified with conductive phases. The major constituents of represented embodiments having ≧50 Mol % in the finished material are of one group (see Group I in Table I and in Table II phases identified by x-ray diffraction).

TABLE I

STABILITY OF SELECTED METAL-SULFIDES RANKED BY HEAT OF FORMATION $\Delta H_f \geq 298°$

| | Sulfide | $\Delta H_f > 298$, Kcal mol$^{-1}$ | T, °K. |
|---|---|---|---|
| Group I | $Y_2S_3$ | −300 | >2000 (sublimes) |
| | $Ce_2S_3$ | −284 | 2160 |
| | $La_2S$ | −292 | >2400 (sublimes) |
| | $Al_2S_3$ | −172.9 | 1370 |

TABLE I-continued

**STABILITY OF SELECTED METAL-SULFIDES RANKED BY HEAT OF FORMATION $\Delta H_f \geq 298^*$**

| | Sulfide | $\Delta H_f > 298$, Kcal mol$^{-1}$ | T, °K. |
|---|---|---|---|
| | CeS | −146.3 | 1950 |
| | ZrS | −138 | 1828 |
| | Ga$_2$S$_3$ | −123.4 | 1363 |
| | CaS | −113.8 | >2000 (sublimes) |
| | SrS | −108.2 | 2275 |
| | Li$_2$S | −106.7 | 1223 |
| | BaS | −106.1 | 2500 |
| | Na$_2$S$_3$ | −103.4 | 1626 |
| | K$_2$S | −99 | 1221 |
| | Na$_2$S$_2$ | −96.2 | 753 |
| | Na$_2$S | −89.5 | 1251 |
| | MgS | −84 | >2000 (sublimes) |
| Group II | Ga$_2$S | −60.4 | >1070 (sublimes) |
| | P$_4$S$_7$ | −60.6 | 581 |
| | B$_2$S$_3$ | −60.3 | 836 |
| | BeS | −55.8 | not available |
| | SiS$_2$ | −51 | >1360 (sublimes) |
| | Sb$_2$S$_3$ | −49 | 820 |
| | Bi$_2$S$_3$ | −48.5 | 1036 |
| | As$_2$S$_3$ | −40 | 585 |
| | GeS$_2$ | −32.5 | 1113 |
| | Ag$_2$S | −7.55 | 1111 |

*K. C. Mills, Thermodynamic Data for Inorganic Sulphides, Selenides and Tellurides, Butterworth & Co., London UK (1974).

TABLE II

REPRESENTATIVE TERNARY AND QUATERNARY ELEMENT CERAMIC PHASES IDENTIFIED WITH THE AID OF X-RAY DIFFRACTION*

CaAl$_2$S$_4$
Ca$_2$Al$_2$SiS$_7$
YAlS$_3$
KAlS$_2$
LiAlS$_2$
CaK$_2$NaS$_3$
MgAlS$_4$
LiAlSeS
CaYAl$_3$S$_7$
BaAl$_2$S$_4$
LaAlS$_3$
CeAlS$_3$
Li$_2$CaS$_2$
Li$_2$SiS$_3$
Li$_4$A$_2$SiS$_7$
LiCaAlS$_3$

*no published x-ray patterns exist for these phases These main constituent sulfides have a significant thermodynamic stability based on heats of formation which are larger negative values than −75 Kcal mol$^{-1}$. Minor constituents (less than 50%) are of another group (see Group II of Table I) having a more positive value heat of formation than −75 Kcal mol$^{-1}$. These minor constituents offer particular desired properties, such as lowered melting points, control of coefficient of thermal expansion and good bonding compatibility with selected metal substrates, without jeopardizing the general corrosion resistance of the sulfide ceramic. A significant number of new mixed metal-sulfide phases are also contemplated as being within the scope of the invention, including the sulfides shown in Table I. These various sulfide ceramics offer chemical stability, are fusable at temperatures ≦1200° C., form dense, strong ceramic bodies and bond well to metals and ceramics.

Prior art has been concerned with formation of sulfide-glasses of predominately lower-stability sulfides (as shown generally in Group II of Table I) with their accompanying lower melting points. Chemical stability of these sulfide glasses is highly dependent upon retaining the glassy-state and on lower temperature uses (i.e., as low as room temperature to 50° C.). The sulfide-glasses are typically formed with LiI to develop a desired Li-ion conductivity.

Based on available thermodynamic and physical data for the metal selenides, new ceramic phases can be utilized based not only on sulfides, but also selenides and combinations of sulfides and selenides. Generally, the selenides offer lower melting points, but also have lower thermodynamic stability based on the heat of formation. For example, Al$_2$S$_3$ with a heat of formation of −172.9 Kcal mol$^{-1}$ melts at 1370° K. In the case of Al$_2$Se$_3$ the heat of formation is −135.5 Kcal Mol$^{-1}$, and it melts at 1220° K. Phase formations of sulfides with Al$_2$Se$_3$ is therefore expected to result in materials having a lower melting point compared to Al$_2$S$_3$ alone but also are expected to have lesser stability to alkali-metal or sulfide-selenide environments at higher temperatures. It is also conventional knowledge that selenide containing glasses can be readily formed (see, for example, Kikkawa, S.; Miyai, T.; and Koizumi, M.; *Solid State Ionics* 28-30, p. 743 (1988)). Examples of such conventional selenides glasses are Li$_2$Se-GeSe, Li$_2$S-GeSe, or Li$_2$S-GeS. In this application we disclose formation of new mixed metal-selenide phases and mixed metal-selenide phases with metal sulfide phases, such as, CaAl$_2$Se$_4$, CaAl$_2$Se$_3$S and LiAlSeS.

Single phase compositions of sulfide-ceramics are important to the development of chemical stability in severely-corrosive nonaqueous environments (see for example, U.S. Pat. Nos. 4,764,437 and 4,687,717 which are incorporated by reference herein). Ceramic glasses can even be formed with single-phase sulfide and/or selenide compositions. These glasses remain chemically stable even if the glass recrystallizes at operating temperatures above 300° to 600° C. A number of single-phase ceramic mixed-sulfides exist, including binary and ternary (and more complicated) mixtures of Li$_2$S, Na$_2$S$_2$, K$_2$S, BaS, CaS, Al$_2$S$_3$, SiS$_2$, MgS and Y$_2$S$_3$ Such mixtures can also include oxide or nitride ceramics (MgO, AlN) fillers with the sulfide mixtures. The single-phases are identified with the aid of X-ray diffraction analysis. The single-phase mixed-sulfide melting points are significantly lower than any individual component sulfide. In spite of the reduction in melting points the mixed sulfides retain the chemical stability of such sulfides as CaS, Al$_2$S$_3$ or Y$_2$S$_3$. The sulfide ceramics remain chemically inert in composites formed with oxides, carbides or nitrides. Stability of these materials is not dependent on formation of a glass.

Other beneficial properties, such as, wetting, bond strength (aggressiveness of reaction with metal component) are also apparent for the compositions disclosed herein. For example, the single-phase ceramic Ca$_2$SiAl$_2$S$_7$ exhibits improved bonding with Mo. The $5 \times 10^{-6}/°$ C. coefficient of thermal expansion matches Mo metal quite well and has an added feature of the aggressive bonding nature of the Si component to the Mo substrate. The mixed-sulfides described herein have generally been prepared by mixing powders of the component sulfides and heating to ≦1100° C. in an Argon atmosphere for one hour. This sulfide product can be reduced to powders, blended and heated again to increase homogeneity.

A starting sulfide and/or selenide based ceramic sealant material can be prepared in accordance with the invention and without using a significant amount of filler material (e.g., only 0 to 5 wt % CaO in CaAl$_2$S$_4$). The fusable sulfide and/or selenide base material exhibits a low viscosity and acts to readily wet the material to which a bond is sought. For example, wetting angles on metals are ≦20°, and generally approach 0°. As applied to metal or ceramic surfaces at temperatures above their melting point (see Table III), surface bonding is readily attained with ≧95% coverage and wetting occurs over large distances on the surface. In the application of a sealant material for parts assembly, a minor amount of inert filler is incorporated to the localized area of application. The excellent wetting and bonding of the subject ceramic compositions enables use of the ceramics for laminating metal to metal, ceramic to metal, and ceramic to ceramic if the coefficients of thermal expansion are compatible.

TABLE III

MELTING POINTS OF SELECTED SULFIDE CERAMICS

| Composition | Melting Point (sharp), °C |
|---|---|
| $CaAl_2S_4$ | 1050 |
| $CaAl_2SiS_7$ | 740 |
| $CaK_2NaS_3$ | 580 |
| $YAlS_3$ | 1075 |

On metal surfaces the sulfide and/or selenide ceramic is self-fluxing because surface oxides on metals react with sulfur and selenium to form a residual metal and sulfur or selenium oxide gas which leaves the surface as a volatile. Bonding is carried out in an inert gas furnace, although another viable alternative is the use of welding equipment and lasers in ambient to locally heat and fuse the ceramics to bond the parts.

After bond formation a steel part is bright in appearance to the eye, and a clean steel/sulfide and/or selenide ceramic interface is observed metallographically. The ceramic material bonds tenaciously to the metal surface. A minor amount of metal sulfide generated in the chemical reaction at the interface diffuses into the sulfide and/or selenide ceramic without substantially changing any of the ceramic properties, such as its electrically insulating character.

To aid application of the ceramic sulfide and/or selenide material (in powder form) a glue-like mixture can be prepared comprised of non-reacting organic vehicles, solvents and polymers (e.g., hexane and polyisobutylene). The organic vehicles evaporate or decomposes to leave the ceramic sealant powder in the desired location for formation of a bond. The glue-like mixtures are troweled or painted on the area to be bonded to the ceramic. The chalky property of the ceramic presents the alternative of powder adherence on bonding surfaces without need of organic vehicles.

The ceramic can also serve as a protective coating for metals and other ceramics. Coatings can be applied by the techniques described hereinbefore. In addition, one can spray a molten form of the ceramic on a material surface, or one can dip a material to be surface bonded (or laminated) in a bath of molten ceramic.

A ceramic sulfide and/or selenide can be prepared for lower temperature fusion and bond formation using excess sulfur and/or selenium. For example, in the case of sulfide ceramics, a $CaK_2NaS_4$ melts at 400° C. with an appreciable sulfur vapor pressure. As the sulfur vaporizes at 500° C., a sulfide composition is formed having a higher melting point, such as, 580° C. for $CaK_2NaS_3$. This phase change was determined by comparing two consecutive thermal analyses of 25° to 700° C. Addition of elemental sulfur to the sulfide - ceramic sealants can likewise aid in reducing bond formation temperatures. Sulfur vaporizes at 444° C. and further acts as a sintering aid.

Some of the ceramic sulfide and/or selenide sealant compositions are slightly electrically-conductive, e.g., $LiS_2$ containing phases. Although generally the subject ceramics are good insulators, compositions such as $CaAl_2S_4$ and $Ca_2Al_2SiS_7$, can be formulated into electrically conductive sealants by addition of electrically-conductive particulate containing refractory metals, refractory metal sulfides and nitrides (e.g., Mo, $MoS_2$, TiN, TiC). The degree of conductivity is regulated by the amount and form of the conductive material added to the basic sulfide and/or selenide ceramic material. As described hereinafter one can also produce a corrosion resistant material while also controlling the coefficient of thermal expansion, as well as the electrical conductivity. In the case of a 20wt % addition of forty-five micron Mo powder to $CaAl_2S_4$, the ceramic composition has about 0.1 (ohm. cm)$^{-1}$ resistivity and also has excellent wettability to coat a steel substrate (see FIG. 1).

These conductive ceramic formulations can also act as brazing materials for "hard to weld" metals (such as, Mo, W and Ti) as well as coated and/or clad metals in which welding would expose the substrate. These formulations also work very well with metal couples which don't weld (Mo/Fe, Mo/Ni, W/Fe) due to extreme differences in melting points and/or lack of weld pool formation. A coating of the sealant material can be an electrically-conductive or a non-conductive formulation which is applied to either or both surfaces to be brazed. The brazing operation can be carried out by localized heating with a laser or electric welder, as well as by use of an inert-gas furnace. Used as a brazing material, the ceramic material when applied to a surface of metal/ceramic can couple various particles to a substrate (e.g., massive abrasive particles present from use of a grinding tool and which help the substrate withstand high temperature operation, or battery materials for an electrode fabrication method in which the sealant also serves as a protective coating). The characteristics of the ceramic compositions described herein enable the filling of cracks in metals and ceramics and in difficult geometries.

Composite Ceramics Sulfides

Composite ceramic sulfide insulating bodies are formed with fusable sulfide ceramics mixed with inert ceramic particulates or fibers of metal oxides or nitrides, such as, MgO, CaO, $Al_2O_3$, $Y_2O_3$, $B_2O_3.Al_2O_3$, BN, AlN. These composite materials have designable structural properties (strength, coefficient of thermal expansion and high temperature fluidity) which can be selectively modified. The coefficient of thermal expansion of $CaAl_2S_4$ is approximately zero. The coefficient of thermal expansion of selected example sulfide composites are shown in Table IV.

TABLE IV

COEFFICIENT OF THERMAL EXPANSION OF $CaAl_2S_4$ COMPOSITES WITH OXIDE FILLER

| Filler Type | Filler Amount, wt % | Coefficient of Thermal Expansion $\times 10^6$/°C. |
|---|---|---|
| CaO | 16 | 5 |
| MgO | 15 | 0 |
| $Al_2O_3$ | 44 | 10 |
| $B_2O_3.Al_2O_3$ (90:10 mol %) | 18 | 8 |

The amount of filler material to be used in dimensionally stable ceramic composite formation is not readily predictable, but are related to the density, wettability, and surface area of the filler materials. Composites in Table II are formulated to retain the shape of a cold-pressed (at 40,000 psi) component after fusing the ceramic at 1100° C. Alternative methods of parts formation include molding, tape casting, and machining of castings. Although the coefficient of thermal expansion of MgO is greater than that of CaO, the sulfide composite formed with CaO has a significantly greater coefficient of thermal expansion. X-ray diffraction has confirmed the inertness of the oxide and/or nitride filler materials with the $CaAl_2S_4$ ceramic. A wide range of coefficients of thermal expansion can be tailored by the selection and relative amount of filler powders incorporated (e.g., a 50:50 wt %., MgO:CaO filler produces a composite with a coefficient of thermal expansion of about $2.5 \times 10^{-6}/°$ C.).

The composite ceramics have also been formed with an excess of a sulfide component (e.g., 30 wt % CaS with $CaAl_2S_4$), which can be pressed into a shape (at 40,000 psi). The resulting composite retains it shape after processing at 1100° C.

The composite sulfide and/or selenide ceramics are machinable in an inert atmosphere and have lubricity qualities which can be enhanced with fillers, such as, $MoS_2$. The resulting composites are suitable for a high temperature bearing application. A bushing of the ceramic composite can be prepared by machining or powder-pressing. The resulting bushing can act to position a component as well as offer lubrication for mechanical motion at high temperatures in a dry, severely-corrosive environment, such as in molten-salt electrorefiners.

A ceramic composite having alkali metal ion conductivity (e.g., $Na^+$, $Ca^+$ and $Li^+$) is formed using ion-conductive particles (e.g., $\beta''$ [$Na_2O$ doped] $Al_2O_3$ for $Na^+$ conductivity). Ionic conductance of the ceramic composite is dependent upon particle-particle contact; therefore, particle size and shape are quite important. A critical level of ionic particle addition is necessary for ion-conductivity of a composite (e.g., 15 wt % $\beta''Al_2O_3$ in $CaAl_2S_4$). Metal oxides, which intercalate $Li^+$, can act as $Li^+$ ion conductor in a sulfide ceramic composite, such as, $Li_xMoS_2$, $Li_xCoO_2$, $Li_xFeO_2$, $Li_xV_3O_8$ and $Li_xV_2O_3$). Although these metal oxide compounds have some electrical conductivity as well, it can be controlled in the composite formulation. The ion-conductive ceramic sulfide and/or selenide composite can be formed into shapes and have good bonding properties with other metals (such as Fe, Ni and Mo) and ceramics (such as $Al_2O_3$, MgO and BN). The ionic-conductive composites also lend themselves to development of sensors for severely corrosive environments, or cells with liquid electrodes (e.g., Li/S cell).

Composite formulations for potting applications have viscous fluid properties at the fusion temperature of the ceramic. For such a potting application, the amount of inert filler is generally less than as above (e.g., 5 to 14 wt % CaO in $CaAl_2S_4$). The potting formulation conforms to the defined geometrical restraints and bonds strongly to the metal and/or ceramic surfaces. Seals are thus formed onto complicated shapes and surfaces with components immobilized, after processing, with a bulk of ceramic material. For example, an electrical feedthrough having a strip or oblong terminal, rather than a rod shape, is fabricated with an annular arrangement of the metal components that can be loaded with the potting ceramic formulation. Upon heating to 1100° C. (and in an inert atmosphere for the $CaAl_2S_4$-sulfide type material), the ceramic sulfide conforms and bonds to affix the positions of the metal components.

Ceramic Sulfide Glass Formation

Due to the reduced melting points of the mixed-sulfide and/or selenide ceramic phases, herein described, new compositions of glasses with enhanced chemical stability are formed. Rapid cooling (quenching) of ceramics results in formation of glasses. The glassy state further enhances long term chemical stability for uses at temperatures below recrystallization and the glass transition temperature. Glass technology lends itself to sulfide and/or selenide ceramic fiber production by way of the conventional filament spinning process. For example, a cup having a number of small holes is filled with molten sulfide and/or selenide and spun. Strands of molten material are generated and upon quenching are cooled to form a glass fiber. A foam structure can also be produced by frothing a pool of molten sulfide and/or selenide material by sparging or agitation and then quenched by pouring into a chilled form. Glass shapes, such as cups, are formed by pouring or dipping a chilled casting form to build-up a coating of solidified glass. For example, a cup is formed by dipping the tip of a rod into a pool of molten sulfide and/or selenide.

Formation of a frit, or a filtration medium, which is composed of the sulfide and/or selenide glass fibers and/or particles is produced as a mat that is sintered at 1000° C. for a 1050° C. fusion composition. The sintering promotes fiber/fiber and particle/fiber bonding to increase the strength of the resulting mat. Fiber size and mat density determine ultimate filtration properties. Such fiber mats are expected to provide excellent separator properties for Li/organic electrolyte (e.g., LiAsF/2Me-THF or propylene carbonate), $Li/SO_2$, or $Li/SO_2Cl_2$ battery cells.

The ceramic sulfide and/or sulfide/selenide materials described herein can be used in other forms of the invention to effectuate metal/metal, ceramic/ceramic and graded layer transitions for metals, ceramics and glass composites. The foregoing description of various embodiments of the invention have been given for illustration purposes and are not meant to be exhaustive. The inventions are thus defined only in terms of the claims and the full range of equivalents to which the claims are entitled to cover.

EXAMPLES

The following non-limiting examples illustrate preparation of several exemplary ceramic materials and articles of manufacture.

A general screening procedure for chemical stability was based on use of DTA (differential thermal analysis) which can detect reaction of the sulfide and/or selenide ceramic with alkali-metals. For example, a 75 mg ceramic sample was used which consisted of 50 mg of a sulfide ceramic and a 25 mg LiAl electrode mixture (LiAl+LiCl-LiBr-KBr). The melt was examined in a temperature range of 25° to 550° C., and an exothermal peak would indicate the occurence of a chemical reaction. CaS-based compounds (e.g., $CaAl_2S_4$, $Ca_2SiAl_2S_7$) have no exothermal peak. Testing of $Al_2S_3$ indicates a minor chemical reaction occurs which should not have substantial effect on its performance. An examination of Ca-alloy (CaAlSi alloy) stability with $CaAl_2S_4$ was also conducted in the presence of LiCl-LiBr-KBr, in the same manner as above. Stability testing with Na and $NaS_x$ was conducted by direct contacting of the sulfide ceramic at about 400° C. with confirmation of stability by performing conventional powder x-ray diffractometry on the tested specimens.

EXAMPLE 1

A ceramic sulfide sealant material can be prepared by blending high purity starting materials (>99.9%, or ≧99.5% from Alfa Chemical Co.) −200 mesh particles in a micromill (V-blender for larger batches). The sulfide starting constituents, CaS and $Al_2S_3$, are used in appropriate molar quantities to form $CaAl_2S_4$, that is 33 wt % CaS and 67 wt % $Al_2S_3$. A slight excess of CaS is normally desired since to err in favor of CaS will assure that no free $Al_2S_3$ phase remains after fusion at 1100° C. to form the $CaAl_2S_4$ which has a 1050° C. melting point. This is done in an Argon atmosphere furnace to avoid water contact. However, $N_2$ and possible $O_2$ may not be a problem for rapid fusing. The $CaAl_2S_4$ is typically combined with 5 wt % CaO powder and added into the initial blending operation to give the sulfide sealant a useful viscosity which confines it to the seal area of an article of manufacture. The $CaAl_2S_4$ formed by fusing (rather than sintering) enables very rapid end product formation. A single phase sulfide is identified by conventional powder X-ray diffractometry. Homogeneity is accomplished rapidly in the melt; and the constituents totally wet each other. Quenching of the molten sulfide ceramic sealant material produces a glass. Chemical stability is not dependent on glass formation, but is dependent on phase formation which incorporates inherently chemically-stable sulfides, such as CaS, $Al_2S_3$, $La_2S_3$, $Ce_2S_3$, MgS and $Y_2S_3$.

In an Argon atmosphere furnace, the blended powders are heated to 1100° C. in 45 minutes and then are cooled over a 15 minute period in a molybdenum tray. The fused product is then ground to −200 mesh particles for application as a ceramic sulfide sealant material. The excellent wetting of metal and other ceramic surfaces by the ceramic sulfide was noted. Upon fusion of the ceramic sulfide sealant, the surface metal oxides are expelled by the sulfide material enabling attack of the bare metal.

EXAMPLE 2

A metal to ceramic seal is formed by thermally treating two steel ring components at 1100° C. in an inert gas atmosphere. A ring comprised of the sulfide based ceramic (such as, CaS) is disposed between the steel rings. The sulfide based ring (about 2 mm thick×1.05 in ID×1.30 in O.D.) is formed from cold-pressing (at 40,000 psi) powders of previously fused composite mixture of a $CaAl_2S_4$ single phase with 16 wt % CaO (−325 U.S. mesh particles). The components are placed in the furnace with about a 10 g weight placed on the material to maintain component alignment. The material is heated to 1100° C. for an additional 45 minutes, then cooled to room temperature after 15 minutes. The treated metal components obtained from the furnace have a bright condition, where exposed to reducing atmosphere. The sulfide-ceramic is apparently self-fluxing (i.e., the surface oxide on the metal is removed by the sulfur-chemical reaction, metal oxide+S yields metal+$SO_2$ gas). Metallographic examination indicates ≧95% metal/ceramic bonding in which the sulfide ceramic reacts with the metal (in this case steel) surface. Wetting is excellent with wetting-angles observed to approach 0°.

This configuration demonstrated long term chemical stability in a LiAl+LiAlFe/LiCl-LiBr-KBr/FeS molten electrolyte cell environment. One steel component is grounded to the Li-alloy electrode and the other to the FeS electrode. The test was conducted at 425° C. over a 2000 h period. The two steel components remain electrically isolated, and the molten electrolyte is retained by the seal. The seal also exhibits mechanical stability with thermal cycling (room temperature to 450° and back) in excess of six occurences. The seals are vacuum leak tight to the limit of apparatus, which is less than 100 microns.

EXAMPLE 3

Formation of a Molybdenum/ceramic/steel seal requires accommodating to the differences of the coefficient of thermal expansion of the two metals. The initial formation process, as in Example 2, takes place at 1100° C. in an inert gas atmosphere furnace. In this example the ring of ceramic is comprised of two prefused compositions: $CaAl_2S_4$ with 44 wt % $Al_2O_3$ and $CaAl_2S_4$ with 16 wt % CaO. The $Al_2O_3$ containing ceramic exhibits a higher coefficient of thermal expansion of about $10\times10^{-6}/°$ C. compared to $5\times10^{-6}/°$ C. for the CaO filler material. The stresses resulting from the differences in coefficient of thermal expansion between steel at 12 and Mo at 5.5 are accommodated by the transition of coefficient of thermal expansion using the ceramic ring. The ceramic ring is substantially $Al_2O_3$ filler composition at the steel interface and substantially CaO at the Mo interface. This ceramic ring is formed by cold pressing at 40,000 psi powders with a layer of one filler type distributed upon a layer of the other filler type. The pressed ring is fused at 1100° C. for about 30 minutes (with 15 minutes of cooling) prior to seal assembly. The ring maintains good shape control with about 1% shrinkage. The seal components (steel ring, ceramic ring, Mo ring) are assembled with additional application at 1100° C. of a ceramic having a low viscosity and which acts as a bonding agent. Prefused powder of $CaAl_2S_4$ with 5 wt % CaO is applied to the steel/ceramic interface. Powders of $Ca_2Al_2SiS_7$ with 5 wt % CaO are applied to the ceramic/Mo interface. The $Ca_2Al_2SiS_7$ material attacks Mo to a greater degree than $CaAl_2S_4$ and matches the coefficient of thermal expansion of Mo closely. With components positioned in the furnace and using a light weight on the materials to maintain alignment, the ceramic sulfide seal is formed at 1100° C. for 45 minutes and then slowly cooled for 15 minutes to room temperature. This component has been tested as the peripheral seal of a bipolar cell of LiAl+-LiAlFe/LiCl-LiBr-KBr/FeS$_2$ that has been cycled over 450 cycles and 2000 h. The seal has been retained and exhibits high performance and an amp. hr. efficiency ≧98%.

Cell testing, in which the cycler has malfunctioned by exceeding the normal voltage-cutoff, has resulted in applying 2.35 V vs. Li$^0$ to the sulfide ceramic. This 2.35 V is the potential for dissolution of Mo in molten salt. Therefore, the electrochemical stability of the sulfide ceramic and associated seal interfaces apparently exceeds that of molybdenum (Mo). A metallographic examination of a cell, in which 2.65 volts vs. LiAl had been applied, showed no attack of the ceramic seal.

EXAMPLE 4

An excellent metal to ceramic sulfide seal is formed at a reduced temperature of about 650° C. in an inert gas furnace to lessen the effect of joining two metal components of differing coefficient of thermal expansion (such as a six inch diameter ring seal attaching Fe to Mo). Using the components as in Example 3, a Mo/graded CTE (coefficient of thermal expansion) ceramic ring/Fe seal (6 inch diameter) is assembled with a sealant starting material composed of $CaNaK_2S_3$ with 5 wt % CaO powders between the two metal/ceramic interfaces. Dry hexane serves as a vehicle for painting on the powders. A 90 g. weight maintains alignment of the seal components as they are placed in an Argon atmosphere furnace and heated to 650° C. for 45 minutes, followed by a 15 minute cool down. A product resulted with excellent performance characteristics.

EXAMPLE 5

A feedthrough seal (for use, for example, from atmosphere to vacuum) is fabricated to electrically insulate a 25 mil thick × 1.0 inch wide nickel strip terminal from an electrically-grounded steel housing component by fixturing the two metal components with a $\frac{1}{8}''$ wide annulus between them. A sulfide-ceramic potting composition of $CaAl_2S_4$ with 25 wt % $Al_2O_3$ powder is bladed into the annulus, with a gasket-like material, e.g., BN felt, to close off the bottom of the annulus. The feedthrough component is formed in an inert gas furnace at 1100° C. for 30 minutes and cooled over 15 minutes period. The BN felt which sticks to the potting composition can be scraped away.

EXAMPLE 6

A conductive coating is made to protect a steel substrate from a high-sulfur activity environment of $FeS_2$ in LiCl-LiBr-KBr at 425° C. This coating was formed by applying a paint-like mixture containing powders (about 45 micron dia.) of $CaAl_2S_4$ with 15 wt % TiN to the surface of steel. A 5 wt % solution of polyisobutylene ("PIB") in dry hexane was used as the vehicle for the ceramic powder surface application. The hexane evaporates, and the PIB acts as binder to attach the ceramic particles to the metal surface. The coating fuses and readily bonds to the steel surface at 1100° C. in an Argon atmosphere furnace. The PIB leaves the surface by depolymerization and vaporization at 400° C. Due to the excellent wetting of steel by the $CaAl_2S_4$ (with wetting angle approaching 0°), a pore-free coating is obtained. The coating (i.e., surface wetting and bonding) is so aggressive that wire cloth structures have inadvertently been coated. That is, the coating fills in the pores of the wire cloth structure.

EXAMPLE 7

An ionic-conductor membrane structure is fabricated using an ionic conductive sulfide-ceramic composite that is bonded within a commercially-produced $Al_2O_3$ frame. The $Al_2O_3$ and ceramic sulfide is in turn bonded to a weldable metal collar. This component can be used in sensor production or as a solid-state electrolyte for a sodium-anode, energy-storage cell. The ionic-conductor membrane is formed by cold-pressing a plaque of prefused powders of $CaAl_2S_4$ with 25 wt % $\beta''$ $Al_2O_3$ (a Nanion conductor) particulate (45 micron dia.) at 40,000 psi with a 1 mm thickness. The plaque is prepared as a component for assembly by heating to 1100° C. in an Argon atmosphere furnace for 45 minutes and then cooled over a 15 minute period on a molybdenum tray. The three parts are prepared for assembly by application of the sealant onto bonding surfaces. The edge flange of the ionic-conductor membrane is bonded to the $Al_2O_3$ frame, and the flange of the metal collar (steel) is bonded to the outer edge of the $Al_2O_3$ frame. The sealant includes powders composed of $CaK_2NaS_3$ with 10 wt % $Al_2O_3$ and fluidized in hexane with 5 wt % PIB for application with a syringe. The sealant is squirted onto the bonding surfaces, and parts are set into place with a fixture milled from a BN block. The resulting assembly is loaded into an Argon atmosphere furnace to fuse the sealant at 650° C. for 30 minutes with a 15 minute cooling period. In the event of incomplete bonding of the seal area, additional ceramic sealant can be applied to the areas. For purposes of repair the bonding process can be repeated to fuse additional sealant and close any cracks or holes.

EXAMPLE 8

A solid-state lithium battery is formed by stacking pressed-powder layers of LiAl (anode), 20 wt % $Li_xCoO_2$ in $CaAl_2S_4$ (Li-ion conducting electrolyte), and 80 wt % $Li_xCoO_2$ with $MoS_2$ (cathode with electronic current-collector). This battery could be operated as a thermal battery with rapid heating to 600° C. to activate.

EXAMPLE 9

Below is data characteristic of ceramic sulfides prepared in accordance with the invention.

TABLE V

FRACTURE TEST OF CERAMIC COMPOSITES FOR SAMPLE 1" DIAMETER × 2 MM THICK*

| Filler Amount w/ $CaAl_2S_4$ | Fractive Load (kg) |
| --- | --- |
| 1. 40% wt. CaO | 0.70 |
|  | 0.80 |
| 2. 16% wt. CaO | 1.5 |
| 3. 44% wt. Al2O3 | 2.2 |
| 4. 18% wt. B2O3.Al2O3 (90:10) | ≧5.0 |

*by a three point method

RECENT ACCOMPLISHMENTS USING THE SULFIDE CERAMICS
A 5" dia. metal/ceramic ring seal using compositions 1 and 2 above;
Produced hermetic feedthroughs using compositions 1 and 2 ($\frac{1}{4}''$ dia. terminal) which passed leak tightness and over 8 thermal cycle tests (i.e., room temperature to 400° C. and back to room temperature);
A four-cell $Li/FeS_2$ bipolar stack, 6.5 volts, operated >500 cycles at 98% Ah efficiency, to provide proof of concept for the metal/sulfide ceramic seals: 6.5 volts exceeds the 3.4 volt decomposition potential of the molten-halide electrolyte of these cells.

I claim:
1. A method of preparing a nonaqueous corrosion resistant composite material, comprising the steps of:
   (a) preparing a ceramic material selected from the group consisting of sulfides, selenides and combinations thereof and said ceramic material including at least two chemical elements;
   (b) melting said ceramic material;
   (c) wetting a surface with said melted ceramic material wherein said surface is selected from the group consisting of a metallic material, a second ceramic material and combinations thereof; and
   (d) reacting said surface with said ceramic material to form said corrosion resistant composite material.

2. A method of preparing a nonaqueous corrosion resistant composite material, comprising the steps of:
   (a) preparing a single phase sulfide containing ceramic material having at least three chemical elements;
   (b) melting said single phase ceramic material;
   (c) wetting a surface with said melted ceramic material wherein said surface is selected from the group consisting of a metallic material, a second ceramic material and combinations thereof; and (d) reacting said surface with said single phase ceramic material to form said corrosion resistant composite material.

3. The method as described in claim 2 wherein the single phase sulfide containing ceramic material is a sulfide/selenide.

4. The method as defined in claim 2 further including the additional step after said step (b) of applying and joining said melted ceramic material to a third ceramic material to form a graded coefficient of thermal expansion ceramic composite.

5. The method as described in claim 2 further including the additional step of coupling a second metallic material to said melted ceramic material.

6. The method as described in claim 2 further including the step of manufacturing separation components formed from said corrosion resistant composite material for insertion into electrochemical cells having alkali metal or alkali metal alloy electrodes.

7. The method as defined in claim 2 wherein said ceramic material exhibits at least a 95% coverage of said metallic material.

8. A method of preparing a composite material, comprising the steps of:

(a) preparing a single phase ceramic material containing a chalcogen selected from the group consisting of sulfur, selenium and combinations thereof;
(b) melting said single phase ceramic material;
(c) disposing said molten ceramic material on a surface of a metallic material having an oxide layer on said metallic surface;
(d) fluxing said metallic surface through vaporization of a chalgogen oxide selected from the group consisting of sulfur oxide, selenium oxide and combinations thereof at the metallic/ceramic material interface; and
(e) cooling said melted ceramic material to bond said ceramic material to said metallic material to form said composite material.

9. The method as defined in claim 8 wherein said single phase ceramic material is selected from the group consisting of $CaAl_2S_4$, $CaAl_2SiS_7$, $CaK_2NaS_3$, $MfAl_2S_4$, $KAlS_2$, $LiAlS_2$, $CaY_2S_4$, $YAlS_3$, $CaYAl_3S_7$, $BaAl_2S_4$, $LaAlS_3$, $CeAlS_3$, $LiAlSeS$ and $Li_2CaS_2$.

10. The method as defined in claim 8 wherein said composite material comprises a ceramic metal seal.

11. The method as defined in claim 8 wherein said ceramic material is a sulfide.

12. The method as described in claim 11 wherein the sulfide is a sulfide/selenide.

* * * * *